United States Patent Office 3,605,640
Patented Sept. 20, 1971

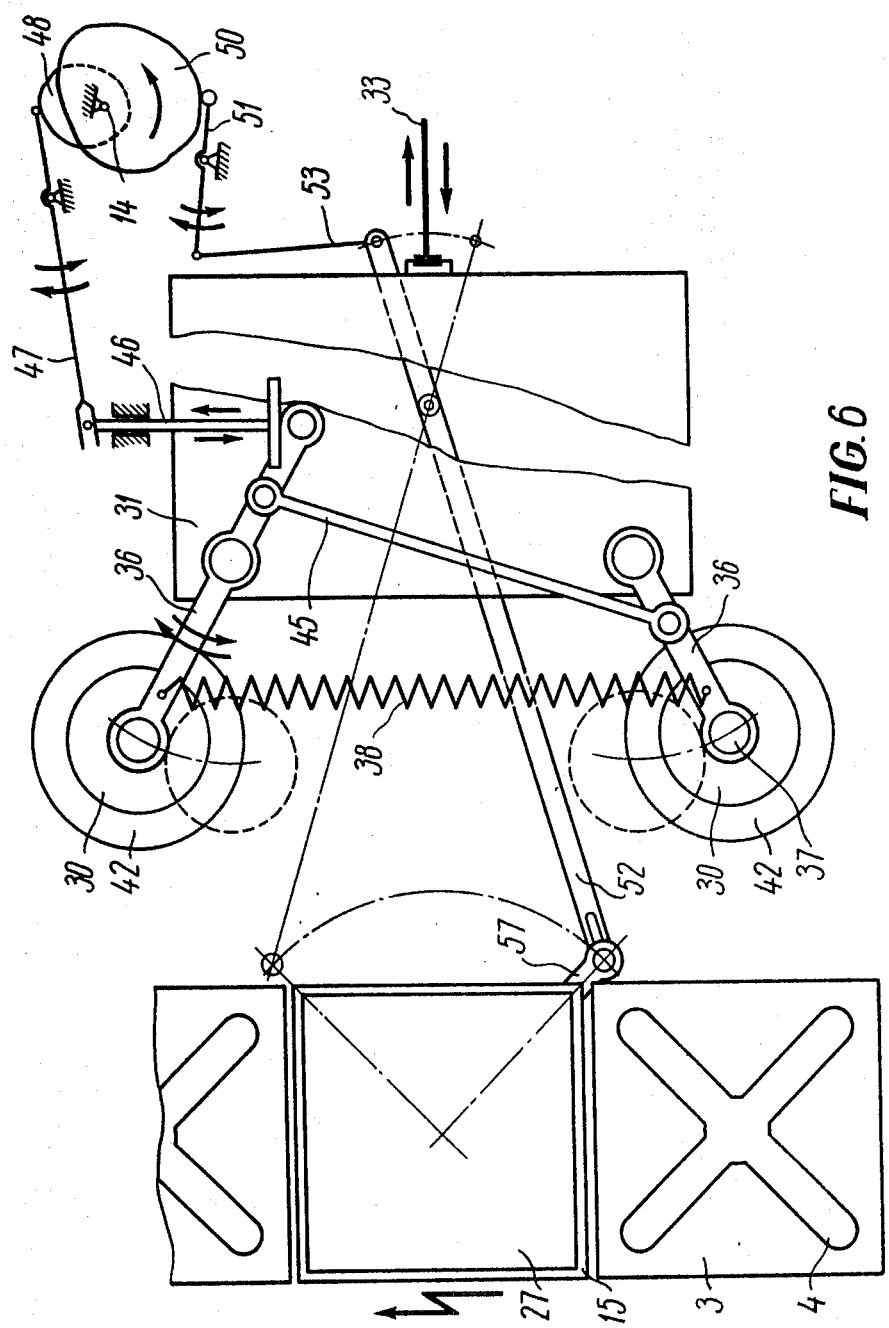

3,605,640
INSTALLATION FOR MAKING MULTILAYER CAKES
Oleg Grigorievich Lunin, Zeleny prospekt 10/32, korpus 27, kv. 17, Moscow, U.S.S.R.
Filed June 26, 1969, Ser. No. 836,902
Int. Cl. A23g 3/00
U.S. Cl. 107—1                      5 Claims

ABSTRACT OF THE DISCLOSURE

An installation for making multi-layer cakes comprises a plurality of mechanisms mounted in succession in the direction of the technological process for treating a cake block displaced by a periodically-actuated conveyor. One mechanism serves for distributing on the side faces of the multi-layer cake the pastry mass laid on the face of each cake block, and this mechanism is located before a mechanism for covering the side faces of the multi-layer cake with crumbs. To cover the face of each cake block with pastry mass, the slit of a slit-shaped nozzle of a mechanism for covering the cake block with pastry mass has a length exceeding the transverse dimensions of the cake block, and the feeding of the pastry mass through the slit of the nozzle is started before the nozzle reaches the cake block and is discontinued after the nozzle has passed above the cake block.

---

The present invention relates to equipment used in the food industry for making pastries and, more particularly, to installations used for making multi-layer cakes.

Known in the prior art are installations for making cakes, comprising the following mechanisms mounted in succession in the direction of the process: a mechanism for covering the surface of a cake block with pastry mass through a slit-shaped nozzle, said cake block being displaced by a periodically-actuated conveyor; a mechanism for forming a multi-layer cake from cake blocks and a mechanism for covering the side faces of the cake with crumbs.

The conventional installations employ a mechanism for covering the side faces of a multi-layer cake with pastry mass, which complicates the design of the installation and requires an additional tank for storing the pastry mass.

The present invention aims at the provision of such an installation for making multi-layer cakes, which is simple in design and has a smaller number of tanks for storing pastry mass and smaller dimensions, thereby making it most advantageous for use in small enterprises.

In the accomplishment of the above and other objects of the invention, the plants used for making multi-layer cakes comprise a mechanism for covering with pastry mass through a slit-shaped nozzle the face of the cake block displaced by a periodically-actuated conveyor, a mechanism for forming a multi-layer cake from the cake blocks and a mechanism for covering the side faces of the cake with crumbs, all the mechanisms being mounted in succession in the direction of the technological process, and according to the invention, a mechanism is provided for distributing the pastry mass, laid on the face of every initial product, onto the side faces of the multi-layer cake, the latter mechanism being mounted relative to the direction of the process before the mechanism for distributing crumbs on the side faces of the cake and being kinematically connected to the drive of the conveyor, the length of the slit-shaped nozzle slits exceeding the transverse dimensions of the cake block and the feeding of the pastry mass through the nozzle slit being started before the nozzle reaches the cake block and discontinued after the nozzle has passed above the latter.

This arrangement makes it possible to dispense with the mechanism used for covering the side faces of the cake block with pastry mass, as well as with the tank used for storing the latter.

The distribution of the pastry mass which has been preliminarily laid on the face of each cake block with some allowance, on the side faces of the cake permits increase in the adherence of the pastry mass to the cake and, in addition, improves the outer appearance of the cake.

The mechanism for distributing the pastry mass on the side faces of the half-finished cake may have, at least, one pair of spring-loaded hollow rollers, mounted above the conveyor capable of reciprocating in a direction perpendicular to the axis thereof, somewhat spaced one from the other for disposing the cake therebetween, said rollers being washed with heated water. It is expedient to arrange the rollers in such a manner that in the course of operation, the generatrix of each of the hollow rollers is parallel to the side face of the cake.

This contributes to a more uniform distribution of the pastry mass on and its reliable adherence to the face of the cake, whereas the washing of the rollers with the heated water makes it possible to maintain the constant temperature of the rollers close to the melting point of the pastry mass, as a result of which the surface of pastry mass covering the side faces of the cake becomes glossy.

To wash the hollow roller with heated water, it is expedient to provide holes in the side face thereof for outflow of water supplied into the inner cavity of the roller.

This object can be also attained by providing a tank with heated water mounted under each hollow roller and capable of travelling in the vertical direction.

The reciprocating motion of the hollow rollers can be effected by means of a slide block, secured on the frame of the installation and kinematically associated with the drive of the conveyor and provided with articulated horizontal levers mounting the axes of the rollers.

The following description of an exemplary embodiment of the present invention is given with reference to the accompanying drawing, in which.

Figure 3:
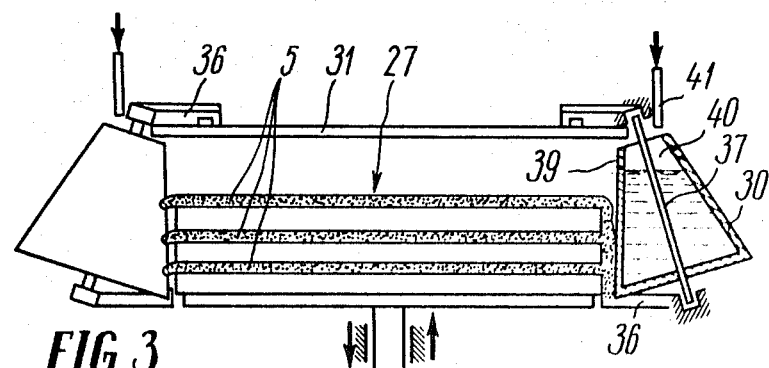
Figure 4:
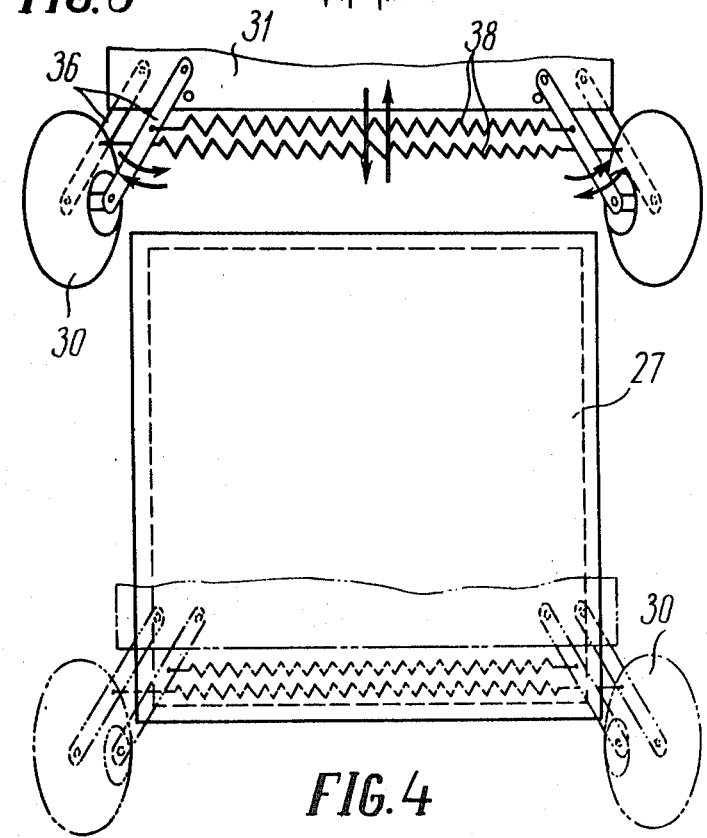
Figure 5:
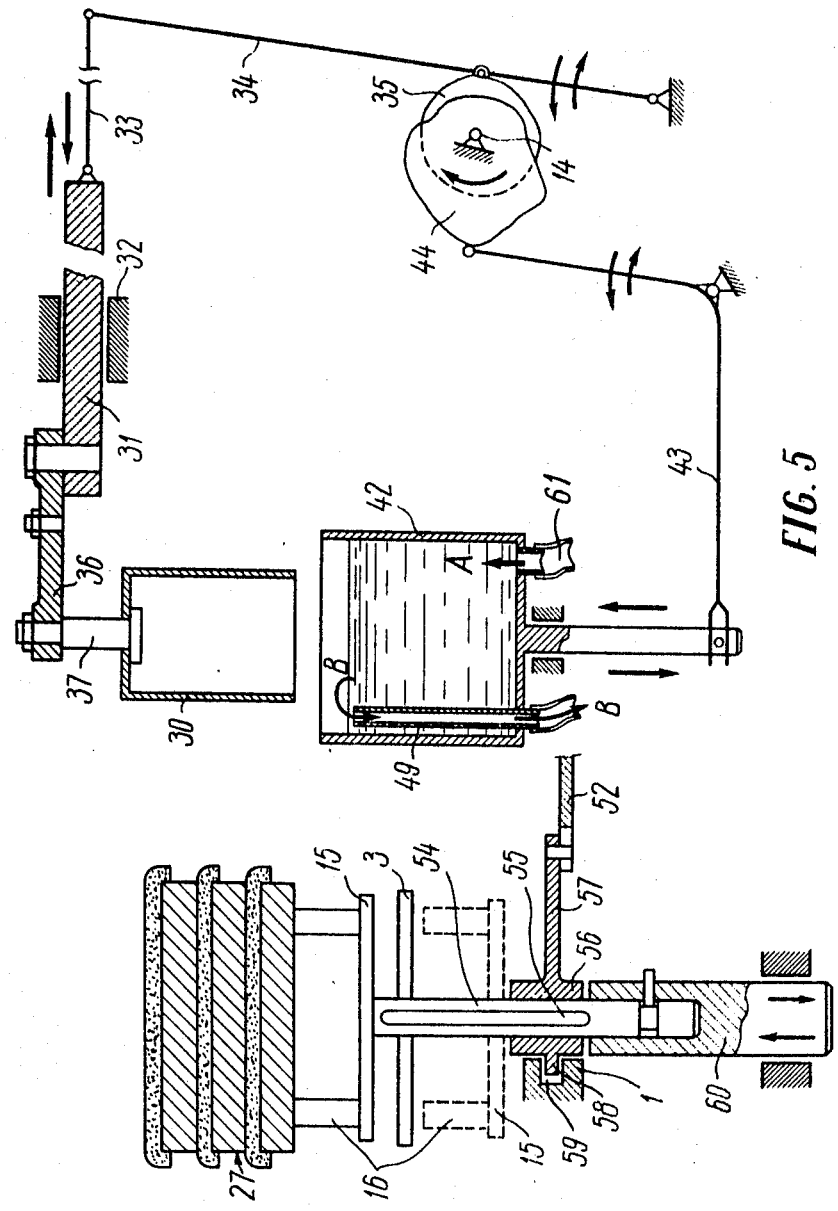

FIG. 3 diagrammatically shows in elevation and partly in section a mechanism adapted for distributing pastry mass on the side faces of a partly finished cake, according to the invention;

FIG. 4 is a top view of the mechanism of FIG. 3;

FIG. 5 is a diagrammatic illustration, partly in section, of a drive means of another embodiment of the mechanism adapted for distributing pastry mass on the side faces of a partly finished cake, according to the invention; and FIG. 6 is a top view of the drive means of FIG. 5.

Figure 1:
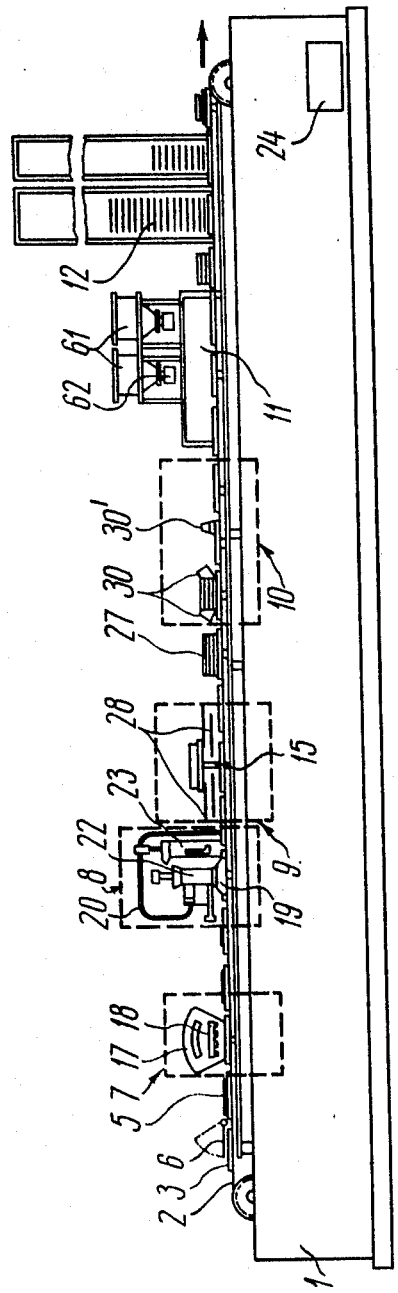
FIG. 1 is a diagrammatic side view of an installation for making multi-layer cakes, according to the invention.
Figure 2:
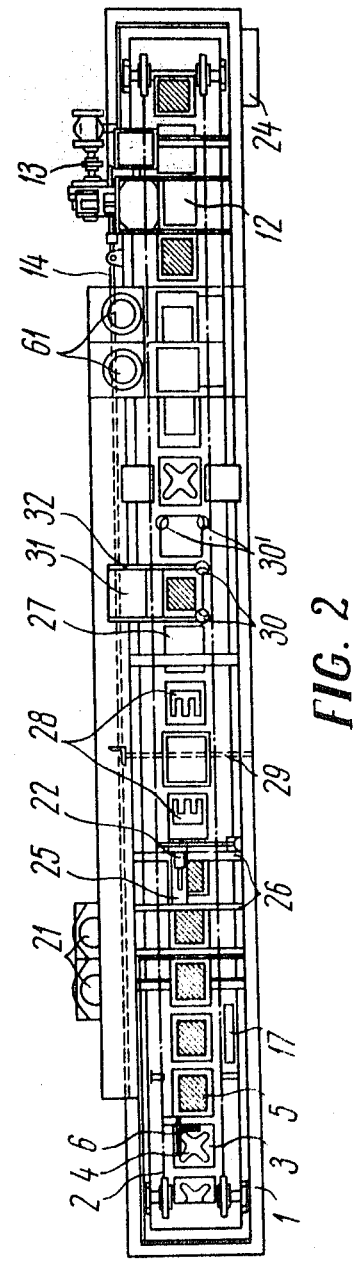
FIG. 2 is a plan view of the installation.

The installation for making multi-layer cakes, for instance sponge cakes, comprises frames 1 (FIG. 1) which mounts periodically-actuated chain conveyor 2 carrying plates 3 with slots 4 (FIG. 2) on which cake blocks 5 of sponge-cakes are to be laid. Mounted above the plates 3 of the conveyor 2 and arranged in succession in the direction of treatment of the cake blocks 5 are: a mechanism for orienting the cake block 5 and having an angular stop 6, secured on a turnable cleat; a mechanism 7 (FIG. 1) for weighing the cake blocks while they are being impregnated with a syrup; a mechanism 8 for covering the cake block face with pastry; a mechanism 9 for making a multi-layer cake from the cake blocks 5; a mechanism 10 for distributing pastry mass on the side faces of the cake; a mechanism 11 for covering the cake side faces with crumbs and a mechanism 12 for placing the cakes into boxes.

All the afore-mentioned mechanisms 7–12, are driven by a drive 13 (FIG. 2) of the chain conveyor 2 (having an electric motor and a gear box with a Maltese cross) through the intermediary of a distribution shaft 14, disposed along the entire length of the installation, bevel gears coupled with shaft 14 and transverse cam shafts (not shown in FIG. 2), arranged under the conveyor 2 perpendicular to the distribution shaft 14.

Mounted at the point of disposition of each of the mechanisms 7–12 and under the plates 3 of the conveyor 2 are lifting-and-lowering tables 15 (FIG. 1), each of the tables 15 having projections 16 (FIG. 5) positioned in accordance with the shape of the slots 4 (FIG. 2) in the plates 3, and being driven by a cam shaft (not shown in FIG. 2) kinematically associated with the distribution shaft 14.

The mechanism 7 (FIG. 1) for weighing the cake block while it is being impregnated with a syrup comprises two interlocked automatic balances 17 and valve 18 with nozzles through which a syrup is applied to moisten the cake block 5.

The mechanism 8 for covering the cake block faces with pastry mass, in accordance with the invention, is essentially constituted as a slit-shaped nozzle 19 connected by means of hose 20 to the tanks 21 (FIG. 2) storing the pastry mass. The length of the slit of nozzle 19 (FIG. 1) exceeds the transverse dimensions of the cake block 5, this being necessary to provide covering of its side faces with the pastry mass so that the latter flows down over the edges of the cake block 5.

The nozzle 19 is connected to valve 22 which overlaps the supply of the pastry mass. The valve 22 is controlled by electromagnet 23 connected to master electric device 24 whose drum (not shown in FIG. 1) is kinematically associated with the distribution shaft 14. The master electric device 24 is adjusted in such a manner that the valve 22 is actuated to start the feeding of the pastry mass through the slit of the nozzle 19 when the nozzle 19 approaches the cake blocks 5, and to discontinue its feeding after the cake has passed the nozzle.

The valve 22 is secured on slide block 25 (FIG. 2) which travels in guide ways 26 mounted on the frame 1. The slide block 25 is caused to reciprocate in the guide ways 26 by a cam of the distribution shaft 14.

The mechanism 9 (FIG. 1) for making a multi-layer cake 27 from the cake blocks 5 essentially comprises two pairs of holders 28 mounted one above the other, the holders 28 of each pair moving towards each other. The number of the pairs of the holders 28 is determined by the number of layers of the cake, according to the formula $n-1$, where $n$ is the number of the cake layers.

The installation is designed for making three-layer cakes and, therefore the mechanism 9 has two pairs of the holders 28.

The holders 28 in each pair are actuated by cam shaft 29 (FIG. 2), the cam for one pair of the holders 28 being secured on the shaft 29 at an angle relative to the cam used for the other pair of the holders 28, which provides for alternative drawing together or moving apart of the pairs of the holders 28 in accordance with the technology of making the cake 27.

The cam of the shaft 29, used to reciprocate the lifting-and-lowering table 15 mounted under the plate 3 at the point of disposition of the mechanism 9, has such a shape which, depending on the technology of making cakes, provides for alternative lifting of the table 15 to the level of each of the pairs of the holders 28.

The mechanism 10 (FIG. 1) for distributing the pastry mass on the side faces of the cake 27 comprises a pair of spring-loaded hollow rollers 30 disposed above the conveyor 2 and somewhat spaced one from the other to dispose the half-finished cake therebetween.

The hollow rollers 30 (FIG. 3) are made either conical or cylindrical (as shown in FIGS. 5 and 6), and the generatrix of each roller in the course of operation is always parallel to the side face of the half-finished cake 27 (FIG. 3.)

The rollers 30 are mounted on slide block 31 adapted for reciprocating in the direction perpendicular to the longitudinal axis of the conveyor 2. The slide block 31 travels in guide ways 32 (FIG. 2) secured on the frame 1 of the installation and block 31 is moved by a lever-and-cam mechanism consisting of rod 33 (FIG. 5), rocker arm 34, and cam 35 secured on the distribution shaft 14.

Articulated to the slide block 31 are horizontal levers 36 which mount pivots 37 of the hollow rollers 30. To provide for the necessary pressure upon the pastry mass portion flowing down from each cake block 5 (FIG. 3), the levers 36 are interconnected by springs 38 (FIG. 4).

In the upper portion of the sides faces of the conical hollow rollers 30 are provided holes 39. Water is supplied into the inner cavity 40 of the rollers 30 by hoses 41 communicating with a tank containing heated water, which water, while flowing out of holes 39, washes the faces of rollers 30.

When the rollers 30 are cylindrical, as is shown in FIGS. 5 and 6, tanks 42 are mounted under the rollers 30 for travel in the vertical direction to wash the faces of the rollers. The tanks 42 are moved by a lever-and-cam mechanism comprising rocker arm 43 and cam 44 secured on the distribution shaft 14.

The rollers 30 are drawn apart and are positioned above the tanks 42 (FIG. 6) by means of a mechanism consisting of rod 45 linking the levers 36, pusher 46, rocker arm 47 and cam 48 secured on the distribution shaft 14.

Water is supplied into the tanks 42 via hoses 61 in the direction indicated by the arrow A (FIG. 5), the constant level of the water in the tanks and its circulation being provided by overflow pipe 49 through which the water flows out of the tanks 42 in the direction indicated by the arrow B.

To distribute the pastry mass on the other two side faces of the cake, the installation is provided with an additional pair of rollers 30' (FIGS. 1 and 2) which are similar to the rollers 30 and travel along the longitudinal axis of the conveyor 2.

In case the installation is provided with only one pair of the rollers 30 or 30' for distributing the pastry mass on the other two faces of the cake, it is necessary to make the lifting-and-lowering table 15 turntable by a lever-and-cam mechanism comprising cam 50 (FIG. 6), secured on the distribution shaft 14, and rocker arms 51 and 52 articulated by rod 53.

The rocker arm 52 is coupled with axle 54 (FIG. 5) of the table 15 by means of a sliding key 55 and a bushing 56 having shank 57. The bushing 56 is provided with an annular projection 58 entering stationary groove 59 of the installation frame 1. The axle 54 of the table is articulated to rod 60 of the mechanism for lifting and lowering the table 15.

The mechanism 11 (FIG. 1) for covering the side faces of the cake with crumbs comprises charging hoppers 61 (FIG. 1) and vibrating hoppers 62, from which crumbs are supplied by compressed air to the partly-finished cake.

Mounted behind the mechanism 11 for covering the cake side faces with crumbs is a mechanism 12 for placing the cakes 27 into boxes.

The described plant for making three-layer cakes operates as follows.

With the drive 13 (FIG. 2) of the chain conveyor 2 actuated and the latter moving, cake blocks 5 are placed on the plates 3 in abutment with the angular stop 6 of the mechanism for orienting the cake blocks. The conveyor 2 moves intermittently and the cake blocks 5 placed on the plates 3 of the conveyor 2, are successively transported and halted at each of the mechanisms 7–12 (FIG. 1) mounted in succession in the direction of production of the cake.

The lifting-and-lowering tables 15 mounted under the conveyor at the point of disposition of each of the mechanisms 7–12, are actuated by the distribution shaft 14 through the intermediary of the cam shafts, and lift the cake blocks 5 above the conveyor in the horizontal position for further processing by the mechanisms driven by the distribution shaft 14.

During the first stop of the conveyor 2 under the valve 18 of the mechanism 7 for weighing the cake block while it is being impregnated with a syrup, the cake block 5 is placed by the lifting-and-lowering table onto the balance 17, where the cake block 5 is moistened until its weight equals a predetermined value, whereupon the valve 18 is closed.

During second stop of the conveyor 2 under the mechanism 8 for covering the faces of the cake block 5 with pastry mass, the slide block 25 (FIG. 2) carrying the valve 22 with the nozzle 19 travels in the guide ways 26. Before the nozzle 19 (FIG. 1) reaches the edge of the cake block the master device 24 actuates the electromagnet 23 which opens the valve 22. From the tank 21 the pastry mass is supplied through the hose 20 into the nozzle 19 and therefrom onto the face of the cake block 5.

The electromagnet 23 is cut off by the master device 24 after the nozzle edge passes above the other edge of the cake block.

Due to the fact, that the nozzle 19 is actuated periodically and the length of the slit of nozzle 19 exceeds the transverse dimensions of the cake block 5, the face of the latter is covered with the pastry mass with some allowance which provides for its flow from all the edges of the cake block.

The cake block 5 impregnated with the syrup and covered with the pastry mass, is fed to the mechanism 9 for making three-layer cakes from the cake blocks. This mechanisms makes cakes from the cake blocks which are fed in succession, and has two pairs of the holders 28 to keep the first cake block in said mechanism until the last, i.e. the third cake block is fed thereto, said holders 28 being designed for storing the first two cake blocks until the third cake block is fed thereto. As the cake blocks are being fed, the holders 28 in each pair alternatively draw together and remove the cake block from the projections of the lifting-and-lowering table 15, each pair being driven by its own cam secured on the shaft 29, coupled with the distribution shaft 14, at an angle to the cam of the other pair of the holders.

While one cake is made from the cake blocks, the lifting-and-lowering table 15 lifts the cake blocks three times to various heights above the conveyor plates, the table each time coming down to a position below the conveyor plate. These lifting, stopping and lowering operations of the table during the period when each cake block is fed in the course of making the cake are effected due to a particular shape of the cam which is also secured on the shaft 29.

In the course of making the cake the lifting-and-lowering table 15, while the conveyor is at a stop, lifts by its projections 16 the cake block 5 above the conveyor and somewhat above the level of the upper pair of the holders 28 which move under the cake block and hold the latter in the course of lowering the table 15. During the next stop of the conveyor, the table 15 lifts by its projections 16 the next cake block above the conveyor 2 and somewhat above the level of the lower pair of the holders 28 which are also moved under the cake block and hold the latter during the table lowering.

During the next stop of the conveyor, the table 15 somewhat lifts a third cake block and comes to a stop under the lower pair of the holders. At this moment the holders 28 of the upper pair move apart, thus lowering the first cake block over the second one, whereupon the holders of the lower pair move apart and the two-layers of the cake are placed on the third cake block and, then, the lifting-and-lowering table 15 descends to lower the three-layer cake 27 onto the plate of the conveyor.

The three-layer cake thus made is supplied by the conveyor to the mechanism 10 for distributing the pastry mass on the side faces of the cake. The lifting-and-lowering table 15, disposed under this mechanism, lifts the cake above the conveyor to the level of the rollers 30.

At this moment the slide block 31 is moved in the guide ways 32 (FIG. 2) by the lever-and-cam mechanism and drives the rollers along the transverse sides of the cake. The pivots 37 (FIG. 3) of the rollers 30 being secured on the levers 36 interconnected by the spring 38 (FIG. 4) and the generatrix of each of the rollers being parallel to the side face of the cake, the rollers 30, by pressing the pastry mass, uniformly distribute the latter along the side faces of the cake.

If the rollers 30 are conical, in the course of their displacement along the side face of the cake, water flows out of the holes 39 (FIG. 3) to wash the roller face and heat it. As the heated surface of the rollers contacts the pastry mass, the latter partially melts and its face becomes even and glossy.

If the rollers 30 are cylindrical, as is shown in FIG. 5, their faces are washed before the slide block 31 starts moving in the guide ways, for which purpose the rollers 30 are moved apart by the cam 48 (FIG. 6) through the intermediary of the rods 45, pushers 46, rocker arm 47, and are positioned above the tanks 42. Thereupon, the tanks 42 are moved in the vertical direction by the cam 44 (FIG. 5) through the intermediary of the rocker arm 43, until the rollers 30 are completely immersed therein. After the rollers 30 are heated, the tanks 42 are returned to their initial position.

After the rollers 30 have distributed the pastry mass on the side face of the cake and have come back to their initial position, the lifting-and-lowering table 15 lowers the cake onto the plate 3 of the conveyor 2, and moves still lower to let its projections 16 protrude from the slots 4 of the plate 3.

With the conveyor 2 (FIG. 2) one steps further, the latter stops the cake under the other pair of rollers 30' (similar to the rollers 30) effecting the treatment of the other two sides of the cake.

If the installation is provided with only one pair of the rollers 30, the lifting-and-lowering table 15, by turning about its axis through 90°, turns the cake so that the same rollers can treat its other two sides.

Then, the cake is stopped under the mechanism 11 (FIG. 1) for covering its side faces with crumbs supplied by means of compressed air from the hopper 61 and vibrating hopper 62.

Thereupon, the cake is supplied to the mechanism 12 for placing the cakes into boxes. The box with the cake is taken off the conveyor and delivered for further dressing of the cake.

What is claimed is:

1. An installation for making multi-layer cakes, comprising a conveyor with plates for cake blocks to be laid thereon; a drive for periodically moving said conveyor; a plurality of mechanisms, mounted above said conveyor, kinematically connected with its drive, and arranged in succession in the direction of the technological process for orienting the cake blocks, for weighing the cake blocks while they are being impregnated with a syrup, for covering the face of each cake block with pastry mass through a slit-shaped nozzle, for making a multi-layer cake from the cake blocks, for distributing the pastry mass on the surface of each cake block, on the side faces of the multi-layer cake, for covering the side faces of the multi-layer cake with crumbs and for placing the multi-layer cakes into boxes; the length of the slit of said slit-shaped nozzle exceeding the transverse dimensions of a cake block and the feeding of the pastry mass being started before the nozzle reaches the cake block and being discontinued after the nozzle has passed above the cake block.

2. An installation according to claim 1, wherein the mechanism for distributing the pastry mass on the side faces of the multi-layer cake comprises, at least one pair of spring-loaded hollow rollers, mounted above the conveyor for reciprocating in a direction perpendicular to the axes of the rollers, spaced from each other to receive the multi-layer cake therebetween and means for washing the rollers with heated water, each of the rollers having a generatrix in the course of operation disposed parallel to the side face of the multi-layer cake.

3. An installation according to claim 2, wherein the means for washing the rollers with heated water comprises holes provided in the upper portion of the side faces of the hollow rollers to wash the latter with said heated water, the water being supplied into the inner cavity of the rollers and flowing out through said holes.

4. An installation according to claim 2, the means for washing the rollers with heated water comprises a tank containing a liquid for washing the face of a roller, said tank being mounted under each hollow roller for travel in the vertical direction.

5. An installation according to claim 2, comprising means for reciprocating the hollow rollers including a slide block, fixed guide ways in which the slide block travels, and means kinematically associated with the drive of the conveyor and said slide block to reciprocate the latter and including articulated horizontal levers pivotably mounting the rollers.

References Cited
UNITED STATES PATENTS

| | | | |
|---|---|---|---|
| 3,450,069 | 6/1969 | Santa Cruz | 118—18X |
| 3,489,102 | 1/1970 | Lunin | 107—1 |

WALTER A. SCHEEL, Primary Examiner

A. I. CANTOR, Assistant Examiner